US010838380B2

(12) United States Patent
Chou et al.

(10) Patent No.: US 10,838,380 B2
(45) Date of Patent: Nov. 17, 2020

(54) AMPLIFIER SELECTION DEVICE, AMPLIFIER SELECTION METHOD, AND COMPUTER READABLE MEDIUM HAVING FUNCTION OF CLARIFYING ERRONEOUS SELECTION PART

(71) Applicant: FANUC CORPORATION, Yamanashi (JP)

(72) Inventors: Norihiro Chou, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 19 days.

(21) Appl. No.: 15/993,763

(22) Filed: May 31, 2018

(65) Prior Publication Data

US 2018/0348719 A1 Dec. 6, 2018

(30) Foreign Application Priority Data

Jun. 6, 2017 (JP) .................................. 2017-111718

(51) Int. Cl.
*G05B 15/02* (2006.01)
*H02P 5/46* (2006.01)
(Continued)

(52) U.S. Cl.
CPC ............. *G05B 15/02* (2013.01); *G05B 17/02* (2013.01); *H02P 4/00* (2013.01); *H02P 5/00* (2013.01);
(Continued)

(58) Field of Classification Search
CPC .... G05B 15/02; G05B 17/02; G05B 19/0426; G05B 19/056; H02P 31/00; H02P 4/00; H02P 5/00; H02P 5/46
See application file for complete search history.

(56) References Cited

U.S. PATENT DOCUMENTS 5,943,245 A * 8/1999 Melfi ...................... G06F 17/50
703/1
2010/0082314 A1* 4/2010 Pritchard ............ G06F 17/5009
703/13
(Continued)

FOREIGN PATENT DOCUMENTS

CN 101806840 A 8/2010
CN 102054086 A 5/2011
(Continued)

OTHER PUBLICATIONS

SEW-Eurodrive: systems manual—servo amplifier MOVIAXIS® having plural axes, vol. Sep. 2013, Bruchsal, 2013, pp. 95 to 97—company document; URL: https://download.sew-eurodrive.com/download/pdf/20062532_G01.pdf; (downloaded on Oct. 31, 2019).

(Continued)

*Primary Examiner* — Kamini S Shah
*Assistant Examiner* — Peter T. Pham
(74) *Attorney, Agent, or Firm* — Hauptman Ham, LLP

(57) ABSTRACT

An amplifier selection device includes: a characteristic data storage configured to store a database including respective characteristic data of a plurality of motors, amplifiers, and common power sources; a motor selector configured to display a list of identification information of the motors and select a motor; an amplifier selector configured to display a list of identification information of the amplifiers and select an amplifier; a common power source selector configured to display a list of identification information of the common power sources and select a common power source; a display configured to display a combination of the motor, the amplifier, and the common power source; and a determiner configured to determine whether a relation of the characteristic data satisfies first and second conditions, and when at least one of the conditions is not satisfied, the display (Continued)

clarifies a combination which fails to satisfy the first or second condition.

3 Claims, 4 Drawing Sheets

(51) Int. Cl.
  *H02P 31/00* (2006.01)
  *G05B 17/02* (2006.01)
  *H02P 5/00* (2016.01)
  *H02P 4/00* (2006.01)
  *G05B 19/042* (2006.01)
  *G05B 19/05* (2006.01)

(52) U.S. Cl.
  CPC .............. *H02P 5/46* (2013.01); *H02P 31/00* (2013.01); *G05B 19/0426* (2013.01); *G05B 19/056* (2013.01)

(56) References Cited

U.S. PATENT DOCUMENTS

2013/0317633 A1* 11/2013 Matsumura ............ G05B 15/02 700/83
2016/0140264 A1* 5/2016 Miura ................. G06F 17/5009 703/2

FOREIGN PATENT DOCUMENTS

| CN | 106712590 A | 5/2017 |
| DE | 102009012488 A1 | 9/2010 |
| EP | 1422635 A1 | 5/2004 |
| JP | 4-60704 A | 2/1992 |
| JP | 2010-193687 A | 9/2010 |
| JP | 2015-139347 A | 7/2015 |
| JP | 2015-192475 A | 11/2015 |
| JP | 2017-93209 A | 5/2017 |
| JP | 2017-93265 A | 5/2017 |

OTHER PUBLICATIONS

STW-Eurodrive: products and solutions, Bruchsal, 2016, p. 221— company document; URL: https://master.sew-eurodrive.com/media/sew_eurodrive/landingpage_media/hannover_messe/pdf_1/de_10/produkte-und-loesungen.pdf; (downloaded on Oct. 31, 2019).

Ranze, Christoph et. al.: A Structure Based Configuration Tool: Drive Solution Designer-DSD, in: IAAI02, 2002, pp. 845 to 852; URL:https://aaai.org/Papers/AAAI/2002/AAAI02-126.pdf; (downloaded on Oct. 31, 2019).

Lenze: Easy Product Finder—basic configuration, Aerzen, Jan. 2017—company document; URL:http://download.lenze.com/TD/EASY%20Product%20Finder%20Basic%20Sizing_v3-0_DE.pdf; (downloaded Oct. 31, 2019).

Office Action issued in German Patent Application No. 10 2018 004 3240; dated Nov. 11, 2019; with English translation; 15 pgs.

* cited by examiner

AMPLIFIER SELECTION DEVICE, AMPLIFIER SELECTION METHOD, AND COMPUTER READABLE MEDIUM HAVING FUNCTION OF CLARIFYING ERRONEOUS SELECTION PART

This application is a new U.S. patent application that claims benefit of JP 2017-111718 filed on Jun. 6, 2017, the content of 2017-111718 is incorporated herein by reference.

BACKGROUND OF THE INVENTION

1. Field of the Invention

The present invention relates to an amplifier selection device, an amplifier selection method, and a computer readable medium, and more particularly, to an amplifier selection apparatus, an amplifier selection method, and a computer readable medium having a function of clarifying an erroneous selection part.

2. Description of the Related Art

A parameter automatic setting scheme is known in which whether a combination of a servo motor (hereinafter, merely referred to as "motor") and a servo amplifier (hereinafter, merely referred to as "amplifier") to be used is suitable is automatically determined, and when the combination is not suitable, an alarm is output (for example, Japanese Unexamined Patent Publication (Kokai) No. JP H04-60704 A). In such related art, first, an identification code storage means for storing identification codes indicating respective individual types is provided in servo motors and servo amplifiers, and a suitable combination of a servo motor and a servo amplifier is stored. Next, a storage means for storing various parameter values required for controlling each of the servo motors is provided in a control device for controlling the servo motors. When the power is turned on for operation, the control device reads each identification code from the identification code storage means of each of the servo motor and the servo amplifier and determines whether the servo motor and the servo amplifier are suitable in accordance with a combination of the servo motor and the servo amplifier, the combination being stored in the storage means. When the combination is not suitable, an alarm is output.

SUMMARY OF THE INVENTION

In the related art, the servo motor and the servo amplifier are prepared, and when the power is turned on for operation, each identification code of the servo motor and the servo amplifier is read, and whether the servo motor and the servo amplifier are suitable is determined. Accordingly, the servo motors and the servo amplifiers are actually prepared, and when an erroneous selection is made in selecting the most suitable combination of the servo motor and the servo amplifier from among various types of servo motors and servo amplifiers, there may be an issue that much effort and cost are consumed.

An amplifier selection device according to an embodiment of the present disclosure selects a motor, an amplifier, and a common power source. The amplifier selection device comprises: a characteristic data storage; a motor selector; an amplifier selector; a common power source selector; a display; and a determiner. The characteristic data storage stores a database including respective characteristic data of a plurality of motors, a plurality of amplifiers, and a plurality of common power sources. The motor selector displays a list of identification information of the plurality of motors, displays a motor selection command input section for receiving a selection command to select the motor to correspond to the identification information of the plurality of motors, and selects the motor for which the selection command is input into the motor selection command input section. The amplifier selector displays a list of identification information of the plurality of amplifiers, displays an amplifier selection command input section for receiving a selection command to select the amplifier to be combined with the motor selected by the motor selector to correspond to the identification information of the plurality of amplifiers, and selects the amplifier for which the selection command is input into the amplifier selection command input section. The common power source selector displays a list of identification information of the plurality of common power sources, displays a common power source selection command input section for receiving a selection command to select the common power source to be combined with the motor selected by the motor selector and the amplifier selected by the amplifier selector to correspond to the identification information of the plurality of common power sources, and selects the common power source for which the selection command is input into the common power source selection command input section. The display displays a combination of the selected motor, the selected amplifier, and the selected common power source. The determiner determines whether a relation of the characteristic data between the selected motor and the selected amplifier satisfies a first condition under which the amplifier drives the motor, and whether a relation of the characteristic data between the selected motor and the selected common power source satisfies a second condition under which the common power source drives the motor. When the determiner determines that at least one of the first condition and the second condition is not satisfied, the display clarifies a combination of the motor and the amplifier, of which a relation of the characteristic data fails to satisfy the first condition, or clarifies a combination of the motor and the common power source, of which a relation of the characteristic data fails to satisfy the second condition.

An amplifier selection method according to an embodiment of the present disclosure is a method for selecting a motor, an amplifier, and a common power source. The amplifier selection method includes storing a database including respective characteristic data of a plurality of motors, a plurality of amplifiers, and a plurality of common power sources. The amplifier selection method includes displaying a list of identification information of the plurality of motors, displaying a motor selection command input section for receiving a selection command to select the motor to correspond to the identification information of the plurality of motors, and selecting the motor for which the selection command is input into the motor selection command input section. The amplifier selection method includes displaying a list of identification information of the plurality of amplifiers, displaying an amplifier selection command input section for receiving a selection command to select the amplifier to be combined with the selected motor to correspond to the identification information of the plurality of amplifiers, and selecting the amplifier for which the selection command is input into the amplifier selection command input section. The amplifier selection method includes displaying a combination of the selected motor and the selected amplifier. The amplifier selection method includes determining whether a relation of the characteristic data between the selected motor and the selected amplifier satisfies a first condition under which the amplifier drives the motor. The amplifier selection method includes clarifying, when it is determined that the first condition is not satisfied, a combination of the motor and the amplifier, of which a relation of the characteristic data fails to satisfy the first condition. The amplifier selection method includes displaying a list of identification information of the plurality of common power sources, displaying a common power source selection command input section for receiving a selection command to select the common power source to be combined with the selected motor and the selected amplifier to correspond to the identification information of the plurality of common power sources, and selecting the common power source for which the selection command is input into the common power source selection command input section. The amplifier selection method includes displaying a combination of the selected motor, the selected amplifier, and the selected common power source. The amplifier selection method includes determining whether a relation of the characteristic data between the selected motor and the selected common power source satisfies a second condition under which the common power source drives the motor. The amplifier selection method includes clarifying, when it is determined that the second condition is not satisfied, a combination of the motor and the common power source, of which a relation of the characteristic data fails to satisfy the second condition.

A computer readable medium according to an embodiment of the present disclosure, is a computer readable medium that storages an amplifier selection program for selecting a motor, an amplifier, and a common power source. The computer readable medium that storages an amplifier selection program including: a characteristic data storage process; a motor selection process; an amplifier selection process; a first display process; a first determination process; a first inappropriate combination clarifying process; a common power source selection process; a second display process; a second determination process; and a second inappropriate combination clarifying process. The characteristic data storage process is a process for storing a database including respective characteristic data of a plurality of motors, a plurality of amplifiers, and a plurality of common power sources. The motor selection process is a process for displaying a list of identification information of the plurality of motors, displaying a motor selection command input section for receiving a selection command to select the motor to correspond to the identification information of the plurality of motors, and selecting the motor for which the selection command is input into the motor selection command input section. The amplifier selection process is a process for displaying a list of identification information of the plurality of amplifiers, displaying an amplifier selection command input section for receiving a selection command to select the amplifier to be combined with the motor selected in the motor selection process to correspond to the identification information of the plurality of amplifiers, and selecting the amplifier for which the selection command is input into the amplifier selection command input section. The first display process is a process for displaying a combination of the selected motor and the selected amplifier. The first determination process is a process for determining whether a relation of the characteristic data between the selected motor and the selected amplifier satisfies a first condition under which the amplifier drives the motor. The first inappropriate combination clarifying process is a process for clarifying, when it is determined that the first condition is not satisfied in the first determination process, a combination of the motor and the amplifier, of which a relation of the characteristic data fails to satisfy the first condition. The common power source selection process for displaying a list of identification information of the plurality of common power sources, display a common power source selection command input section for receiving a selection command to select the common power source to be combined with the motor selected in the motor selection process and the amplifier selected in the amplifier selection process to correspond to the identification information of the plurality of common power sources, and select the common power source for which the selection command is input into the common power source selection command input section. The second display process is a process for displaying a combination of the selected motor, the selected amplifier, and the selected common power source. The second determination process is a process for determining whether a relation of the characteristic data between the selected motor and the selected common power source satisfies a second condition under which the common power source drives the motor. The second inappropriate combination clarifying process is a process for clarifying, when it is determined that the second condition is not satisfied in the second determination process, a combination of the motor and the common power source, of which a relation of the characteristic data fails to satisfy the second condition.

BRIEF DESCRIPTION OF THE DRAWINGS

The objects, features and advantages of the invention will become more apparent from the following description of the embodiments in connection with the accompanying drawings, wherein.

DETAILED DESCRIPTION

Hereinafter, an amplifier selection device, an amplifier selection method, and a computer readable medium according to an embodiment of the present disclosure will be described with reference to drawings. However, it is noted that the technical scope of the present invention is not limited to embodiments, but includes the invention disclosed in Claims and its equivalents.

Figure 1:
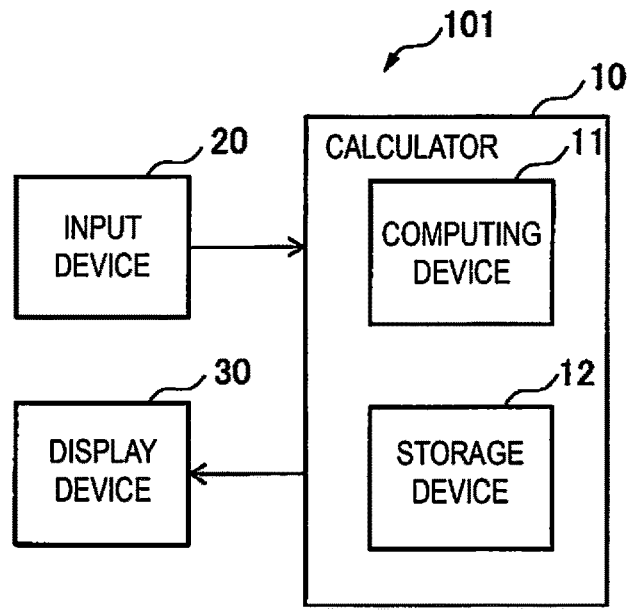
FIG. 1 is a configuration diagram of an amplifier selection device according to an embodiment.

FIG. 1 illustrates a configuration diagram of the amplifier selection device according to an embodiment. An amplifier selection device 101 includes a calculator (computer) 10, an input device 20, and a display device 30. The calculator 10 includes a computing device 11 and a storage device 12. The storage device 12 is, for example, a recording medium (computer readable medium) such as an HDD (hard disk), a flash memory, etc., and stores an amplifier selection program according to the embodiment. The computing device 11 executes the amplifier selection program, which is stored in the storage device 12, according to the embodiment.

Figure 2:
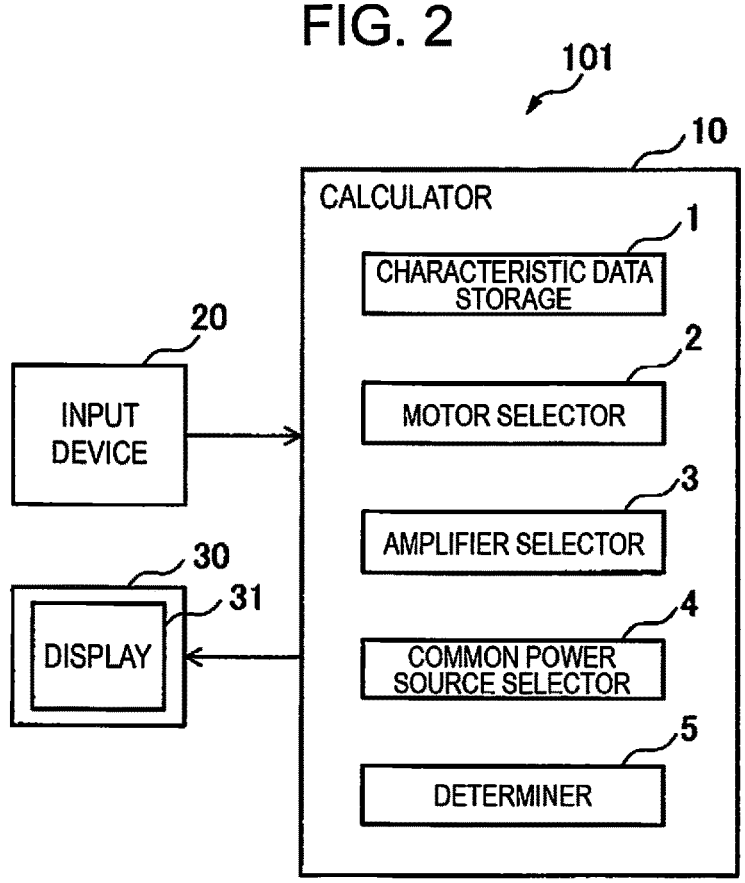
FIG. 2 is a functional block diagram of the amplifier selection device according to the embodiment.

FIG. 2 illustrates a functional block diagram of the amplifier selection device according to the embodiment. The amplifier selection device 101 according to the embodiment includes a characteristic data storage 1, a motor selector 2, an amplifier selector 3, a common power source selector 4, a determiner 5, and a display 31.

As an input device 20, for example, a keyboard, a mouse, etc., can be used. The input device 20 enables inputting of each of characteristic data of a motor, an amplifier, and a common power source, and enables selecting of a desired motor, amplifier, and common power source from among a plurality of motors, a plurality of amplifiers, and a plurality of common power sources.

A liquid crystal display (LCD) device or an organic light emitting display (OLED) device can be used as the display device 30. The display 31 is provided in the display device 30, and the display 31 displays a selected motor, a selected amplifier, and a selected common power source by the input device 20, and a block diagram of a combination thereof.

The characteristic data storage 1 stores a database including respective characteristic data on the plurality of motors, the plurality of amplifiers, and the plurality of common power sources. Herein, the characteristic data of a motor include a continuous rated current, a short-time rated current, a maximum current during acceleration, a continuous rated output, a short-time rated output, and an acceleration maximum output of the motor. The characteristic data of an amplifier include a continuous rated current, a short-time rated current, and a maximum current during acceleration of the amplifier. The characteristics of a common power source include a continuous rated output, a short-time rated output, and an acceleration maximum output of the common power source.

Herein, the "continuous rated current" is a current with which the motor can be continuously used at a rated output. The "short-time rated current" is a current with which the motor can be operated at a rated output for a designated, fixed time. The "maximum current during acceleration" is the maximum value of a current that brings a motor in a state of stoppage or low-speed idling into a speed area required for a regenerative operation and accelerates the motor.

Similarly, the "continuous rated output" is a rated output with which the motor can be continuously used. The "short-time rated output" is a rated output with which the motor can be operated at a rated output for a designated, fixed time. The "acceleration maximum output" is the maximum value of output that brings a motor in a state of stoppage or low-speed idling into a speed area required for a regenerative operation and accelerates the motor.

Figure 3:
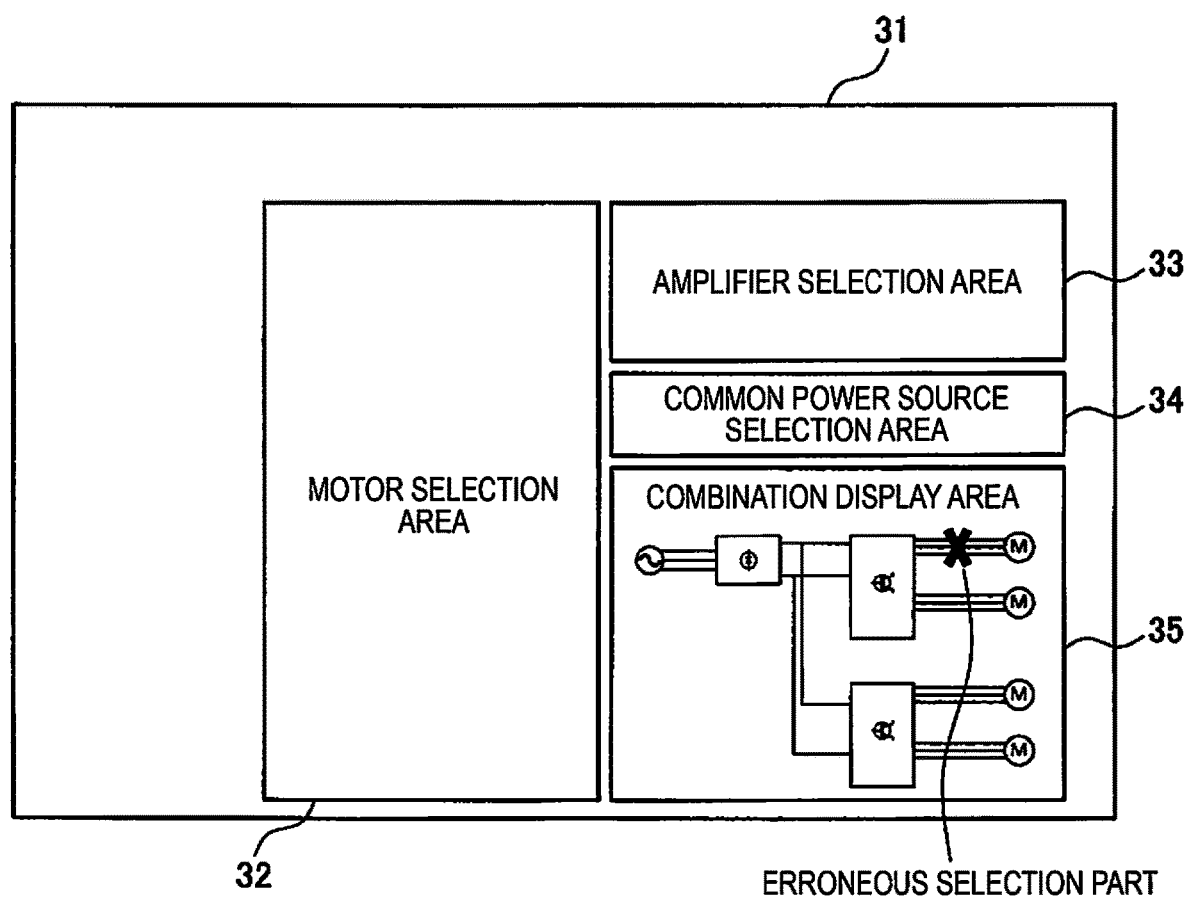
FIG. 3 is a diagram illustrating a display example of display areas of a display of the amplifier selection device according to the embodiment.

The motor selector 2 displays a list of identification information of the plurality of motors. The motor selector 2 displays a motor selection command input section that receives a selection command for selecting a motor to correspond to the identification information of the plurality of motors. The motor selector 2 selects the motor for which the selection command is input into the motor selection command input section. FIG. 3 illustrates a display example of display areas on the display of the amplifier selection device according to the embodiment. The display 31 displays, for example, a motor selection area 32, an amplifier selection area 33, a common power source selection area 34, and a combination display area 35. The identification information of a motor is a model name, the number, etc., of the motor. A list of identification information of the plurality of motors is displayed on the motor selection area 32. The motor selection command input section is a button, etc., displayed on the motor selection area 32. The selection command is input by clicking buttons displayed in alignment with the identification information of the plurality of motors. For example, "the first motor", "the second motor", "the N-th motor" (N is an integer of one or more) are displayed as the identification information of the motors on the motor selection area 32. "The first motor" and "the second motor" are selected by clicking buttons displayed in the vicinity of "the first motor" and "the second motor". The form of the motor selection command input section is not limited to the buttons, but may be a pull-down list or another form.

The amplifier selector 3 displays a list of identification information of the plurality of motors. Additionally, the amplifier selector 3 displays an amplifier selection command input section that receives a selection command for selecting an amplifier to be combined with the motor that has been selected by the motor selector to correspond to the identification information of the plurality of amplifiers. The amplifier selector 3 selects the amplifier for which the selection command is input into the amplifier selection command input section. The identification information of the amplifier is a model name, the number, etc., of the amplifier. A list of identification information of the plurality of amplifiers is displayed on the amplifier selection area 33. The amplifier selection command input section is a button, etc., displayed on the amplifier selection area 33. The selection command is input by clicking buttons displayed in alignment with the identification information of the plurality of amplifiers. For example, "the first amplifier", "the second amplifier", . . . , "the M-th amplifier" (M is an integer of one or more) are displayed as the identification information of the amplifiers on the amplifier selection area 33. "The first amplifier" and "the second amplifier" are selected by clicking buttons displayed in the vicinity of "the first amplifier" and "the second amplifier". Herein, each motor and an amplifier for driving the aforementioned motor may be selected in association with each other in such a manner that the first amplifier is selected as an amplifier for driving the first motor and the second motor, and the second amplifier is selected as an amplifier for driving the third motor and the fourth motor. The form of the amplifier selection command input section is not limited to the buttons, but a pull-down list or another form may be applied.

The common power source selector 4 displays a list of identification information of the plurality of common power sources. The common power source selector 4 displays a common power source selection command input section that receives a selection command for selecting the common power source to be combined with the motor that has been selected by the motor selector 2 and the amplifier that has been selected by the amplifier selector 3 to correspond to the identification information of the plurality of common power sources. The common power source selector 4 selects the common power source in which the selection command is input into the common power source selection command input section. The identification information of the common power source is a model name or the number of the common power source. A list of identification information of the plurality of common power sources is displayed on the common power source selection area 34. The common power source selection command input section is a button, etc., displayed on the common power source selection area 34. The selection command is input by clicking buttons displayed in alignment with the identification information of the plurality of common power sources. For example, "the first common power source", "the second common power source", . . . , "the K-th common power source" (K is an integer of one or greater) are displayed as the identification information of the common power sources on the common power source selection area 34. "The first common power source" is selected by clicking a button displayed in the vicinity of "the first common power source". The form of the common power source selection command input section is not limited to the button, but may be a pull-down list or another form.

Figure 4:
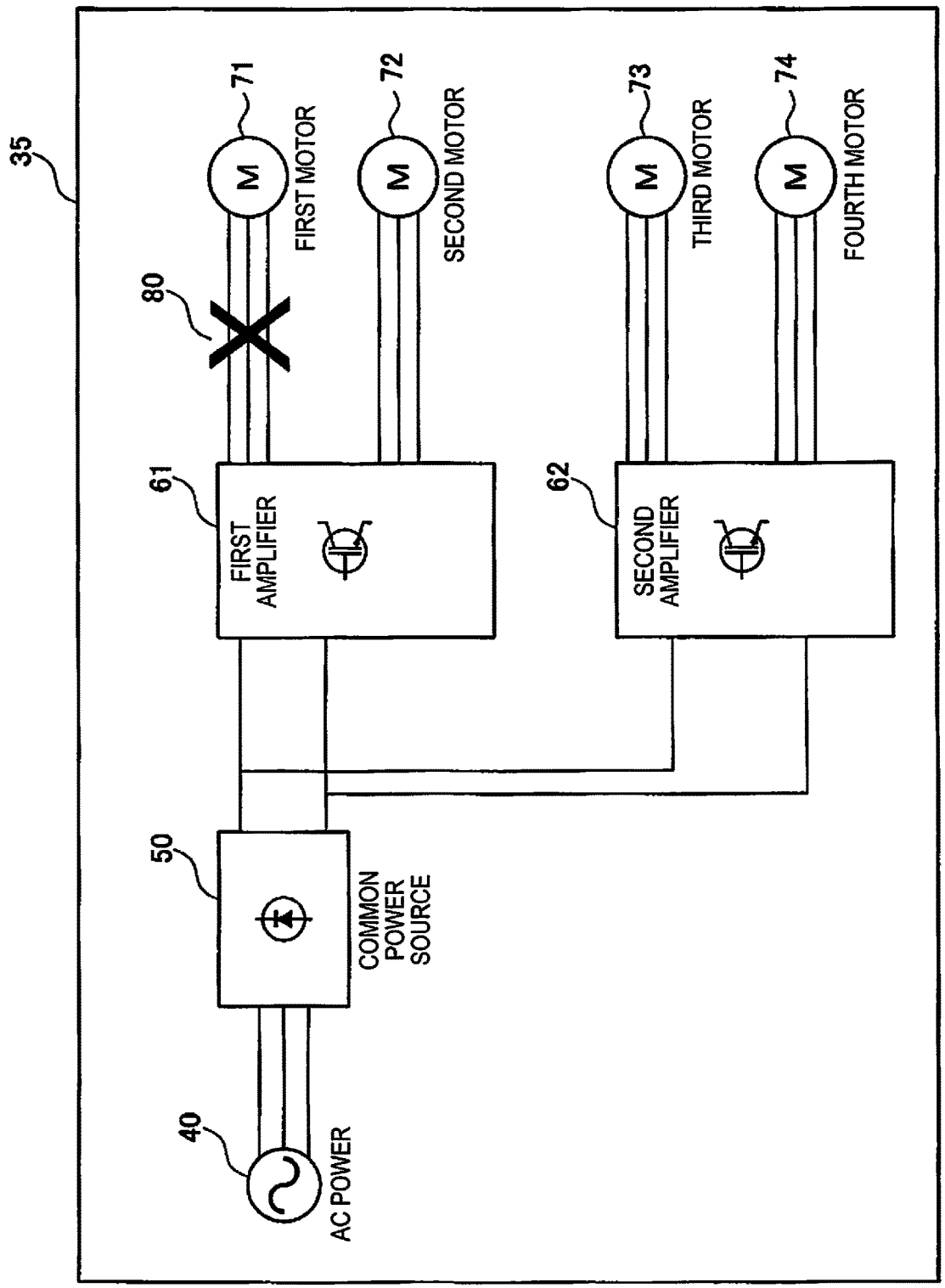
FIG. 4 is a diagram illustrating a display example of a combination of motors, amplifiers, and a common power source in the display of the amplifier selection device according to the embodiment.

The display 31 displays the combination of the selected motor, the selected amplifier, and the selected common power source. FIG. 4 illustrates a display example of a combination of the motors, the amplifiers, and the common power source on the combination display area 35 in the display 31 of the amplifier selection device according to the embodiment. In the embodiment illustrated in FIG. 4, an example in which four motors, i.e., a first motor 71 to a fourth motor 74 are selected is illustrated. The servo motor can be used for the first motor 71 to the fourth motor 74.

Further, in FIG. 4, an example is illustrated in which a first amplifier 61 is selected as an amplifier for driving the selected first motor 71 and the selected second motor 72, and a second amplifier 62 is selected as an amplifier for driving the third motor 73 and the fourth motor 74. An inverter can be used for the first amplifier 61 and the second amplifier 62.

Also, in FIG. 4, an example is illustrated in which a common power source 50 is selected as a common power source for supplying electric power to the selected first amplifier 61 and the selected second amplifier 62. A converter can be used for the common power source 50. Electric power from an AC power source 40 is supplied to the common power source 50.

The determiner 5 determines whether the relation of the characteristic data between the motor and the amplifier that has been selected satisfies a first condition under which the amplifier drives the motor. The determiner 5 determines whether the relation of the characteristic data between the motor and the common power source satisfies a second condition under which the common power source drives the motor. Herein, the first condition, for example, means that the continuous rated current, the short-time rated current, and the maximum current during acceleration of the selected amplifier are equal to or higher than respective values of the continuous rated current, the short-time rated current, and the maximum current during acceleration of the selected motor. However, the aforementioned condition is one example, and another condition satisfied between the motor and the amplifier can be set as the first condition.

As illustrated in FIG. 4, a case where the first motor 71 and the second motor 72 are selected, and the first amplifier 61 is selected as an amplifier for driving these motors is described. The first amplifier 61 includes a first axis amplifier and a second axis amplifier (not illustrated) to drive two motors. The first axis amplifier drives the first motor 71, and the second axis amplifier drives the second motor 72.

Table 1 indicates one example of the characteristic data of the first amplifier 61.

TABLE 1

| First amplifier | Continuous rated current | Short-time rated current | Maximum current during acceleration |
|---|---|---|---|
| First axis | A1 | A2 | A3 |
| Second axis | B1 | B2 | B3 |

Also, Table 2 indicates one example of the characteristic data of the first motor 71 and the second motor 72.

TABLE 2

| | Continuous rated current | Short-time rated current | Maximum current during acceleration |
|---|---|---|---|
| First motor | a1 | a2 | a3 |
| Second motor | b1 | b2 | b3 |

Herein, from Table 1 and Table 2, the first condition to be satisfied by the characteristic data of the first motor 71 and the first amplifier 61 is set such that a continuous rated current A1, a short-time rated current A2, and an maximum current during acceleration A3 of the first axis amplifier of the first amplifier 61, which has been selected, are equal to or higher than respective values of a continuous rated current a1, a short-time rated current a2, and an maximum current during acceleration a3 of the first motor 71, which has been selected. That is, all the conditions of $A1 \geq a1$, $A2 \geq a2$, and $A3 \geq a3$ are to be satisfied. However, the aforementioned condition is one example, and another condition satisfied between the motor and the amplifier can be set as the first condition.

Similarly, from Table 1 and Table 2, the first condition to be satisfied by the characteristic data of the second motor 72 and the first amplifier 61 is set such that a continuous rated current B1, a short-time rated current B2, and an maximum current during acceleration B3 of the second axis amplifier of the first amplifier 61, which has been selected, are equal to or higher than respective values of a continuous rated current b1, a short-time rated current b2, and an maximum current during acceleration b3 of the second motor 72, which has been selected. That is, all the conditions of $B1 \geq b1$, $B2 \geq b2$, and $B3 \geq b3$ are to be satisfied.

FIG. 4 illustrates an example in which the second amplifier 62 is selected as an amplifier for driving the third motor 73 and the fourth motor 74, which have been selected. In a similar manner described above, whether the characteristic data of the third motor 73, the fourth motor 74, and the second amplifier 62 satisfy the first condition is determined.

Next, the second condition to be satisfied by the characteristic data between the common power source 50 and the first motor 71 to the fourth motor 74, which have been selected, is set such that the continuous rated output, the short-time rated output, and the acceleration maximum output of the common power source 50, which have been selected, are respectively equal to or higher than sums of the continuous rated output, the short-time rated output, and the acceleration maximum output of the first motor 71 to the fourth motor 74, which have been selected. However, the aforementioned condition is one example, and another condition satisfied between the motor and the common power source can be set as the second condition.

Table 3 indicates one example of the characteristic data of the common power source 50, which has been selected.

TABLE 3

| | Continuous rated output | Short-time rated output | Acceleration maximum output |
|---|---|---|---|
| Common power source | P1 | P2 | P3 |

Table 4 indicates one example of the characteristic data on the output of the first motor 71 to the fourth motor 74, which have been selected.

TABLE 4

|  | Continuous rated output | Short-time rated output | Acceleration maximum output |
|---|---|---|---|
| First motor | w1 | w2 | w3 |
| Second motor | x1 | x2 | x3 |
| Third motor | y1 | y2 | y3 |
| Fourth motor | z1 | z2 | z3 |

From Tables 3 and 4, the second condition is set such that the continuous rated output P1, the short-time rated output P2, and the acceleration maximum output P3 of the common power source 50, which has been selected, are respectively equal to or higher than sums of the continuous rated output (w1, x1, y1, z1), the short-time rated output (w2, x2, y2, z2), and the acceleration maximum output (w3, x3, y3, z3) of the first motor 71 to the fourth motor 74, which have been selected. That is, three conditions below are to be satisfied.

$$P1 \geq w1+x1+y1+z1$$

$$P2 \geq w2+x2+y2+z2$$

$$P3 \geq w3+x3+y3+z3$$

When the determiner 5 determines that at least one of the first condition and the second condition is not satisfied, the display 31 clarifies a combination of a motor and an amplifier, of which the relation of characteristic data fails to satisfy the first condition, or clarifies a combination of a motor and a common power source, of which the relation of characteristic data fails to satisfy the second condition. For example, when the determiner 5 determines that the first condition to be satisfied between the characteristic data of the first motor 71 and the first amplifier 61 is not satisfied, the display 31 displays a marker 80 such as "X", etc., indicating that the condition is not satisfied due to an erroneous selection by the first motor 71 and the first amplifier 61, on the combination display area 35 as illustrated in FIG. 4. In an example illustrated in FIG. 4, only one part in which the characteristic data fail to satisfy the condition is displayed. However, the example is not limited to this. In a case where a plurality of parts in which the characteristic data fail to satisfy the condition are found, these parts may be displayed.

Figure 5:
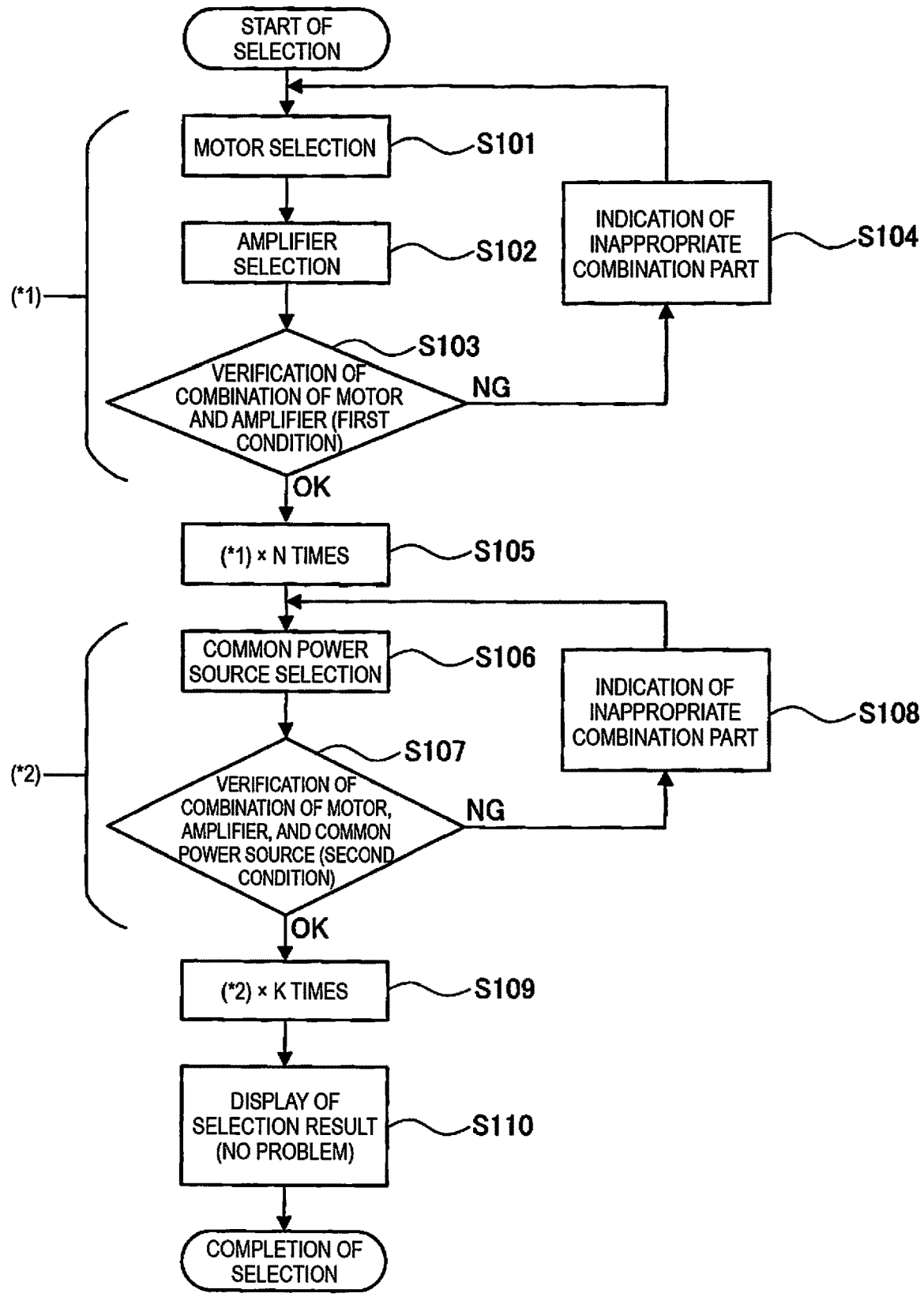
FIG. 5 is a flowchart to describe a procedure of selecting amplifiers by an amplifier selection method according to the embodiment.

Next, the amplifier selection method according to the embodiment will be described. FIG. 5 illustrates a flowchart of selecting amplifiers by an amplifier selection method according to the embodiment.

First, a database including respective characteristic data of a plurality of motors, a plurality of amplifiers, and a plurality of common power sources is stored before the start of selection of the motors (characteristic data storing process). As described above, the characteristic data of a motor include a continuous rated current, a short-time rated current, a maximum current during acceleration, a continuous rated output, a short-time rated output, and an acceleration maximum output of the motor. The characteristic data of an amplifier include a continuous rated current, a short-time rated current, and a maximum current during acceleration of the amplifier. The characteristic data of a common power source include a continuous rated output, a short-time rated output, and an acceleration maximum output of the common power source.

Subsequently, in Step S101, the motor selector 2 displays a list of identification information of the plurality of motors, displays the motor selection command input section that receives a selection command for selecting the motor to correspond to the identification information of the plurality of motors, and selects the motor for which the selection command is input into the motor selection command input section (motor selection process).

Subsequently, in Step S102, the amplifier selector 3 displays a list of identification information of the plurality of amplifiers, displays the amplifier selection command input section that receives the selection command for selecting the amplifier to be combined with the motor that has been selected in the motor selection process to correspond to the identification information of the plurality of amplifiers, and selects the amplifier for which the selection command is input into the amplifier selection command input section (amplifier selection process). As illustrated in FIG. 4, the display 31 displays the combination of the selected motor and the selected amplifier on the combination display area 35 (first display process).

Subsequently, in Step S103, the combination of the motor and the amplifier is verified. That is, it is determined whether the relation of the characteristic data between the selected motor and the selected amplifier satisfies the first condition under which the amplifier drives the motor (first determination process). In the first determination process, when it is determined that the first condition is not satisfied ("NG"), the combination of the motor and the amplifier (inappropriate combination part), of which the relation of characteristic data fails to satisfy the first condition, is displayed in Step S104 (first inappropriate combination clarifying process). Subsequently, returning to Step S101, the motor selector 2 selects the motor for which the selection command is input into the motor selection command input section, and then in Step S102, the amplifier selector 3 selects the amplifier for which the selection command is input into the amplifier selection command input section. The aforementioned description is merely one example, as the methods of selecting the motor and selecting the amplifier, first, the plurality of motors are selected, and then the plurality of corresponding amplifiers may be respectively selected.

In Step S103, as a result of verifying the combination of the motor and the amplifier, when the determiner 5 determines that the relation of the characteristic data between the selected motor and the selected amplifier satisfies the first condition under which the amplifier drives the motor ("OK"), the processes of the aforementioned Steps S101 to S104 are performed for the respective selected motors. That is, when the number of selected motors is N, Steps S101 to S104 (*1) are repeatedly performed for N motors in Step S105.

Next, in step S106, the common power source selector 4 displays a list of identification information of the plurality of common power sources, displays a common power source selection command input section that receives a selection command for selecting the common power source to be combined with the motor that has been selected by the motor selector 2 and the amplifier that has been selected by the amplifier selector 3 to correspond to the identification information of the plurality of common power sources, and selects the common power source in which the selection command is input into the common power source selection command input section. As illustrated in FIG. 4, the display 31 displays the combination of the selected motor, the selected amplifier, and the selected common power source, on the combination display area 35 (second display process).

Subsequently, in Step S107, the combination of the motor, the amplifier, and the common power source is verified. That is, it is determined whether the relation of the characteristic data between the selected motor and the selected common power source satisfies the second condition under which the common power source drives the motor (second determination process). In the second determination process, when it is determined that the second condition is not satisfied ("NG"), the combination (inappropriate combination part) in which the relation of characteristic data fails to satisfy the second condition is displayed in Step S108 (second inappropriate combination clarifying process). Subsequently, returning to Step S106, the common power source selector 4 selects the common power source for which the selection command is input into the common power source selection command input section.

In Step S107, as a result of verifying the combination of the motor, the amplifier, and the common power source, when the determiner 5 determines that the second condition is satisfied ("OK"), the processes of the aforementioned Steps S106 to S108 are performed for each of the selected common power sources. That is, when the number of selected common power sources is K, Steps S106 to S108 (*2) are repeatedly performed for K common power sources in Step S109.

Subsequently, in Step S110, a result of selecting the motor, the amplifier, and the common power source is displayed. When the first condition or the second condition is not satisfied as described above, an inappropriate combination part is displayed. When the motor, the amplifier, and the common power source are selected to satisfy the first condition and the second condition, a display such as "No Problem", etc., is displayed on the combination display area 35 to display that the selection has been appropriately performed.

As described above, according to an amplifier selection device, an amplifier selection method, and a computer readable medium in the present embodiment, it is determined whether the combination of the motor, the amplifier, and the common power source is appropriate. In a case where it is inappropriate, such an inappropriate part is clarified. This enables a user to easily recognize the inappropriate combination, and to select the motors, the amplifiers, and the common power sources as appropriate.

According to an amplifier selection device, an amplifier selection method, and a computer readable medium in embodiments of the present disclosure, erroneous selection can be recognized without actually preparing servo motors and servo amplifiers in selecting the most suitable combination from among from the motors, the amplifiers, and the common power sources of various types. Therefore, the selection of the motors, the amplifiers, and the common power sources can be appropriately performed without taking effort or cost.

What is claimed is:

1. An amplifier selection device configured to select a motor, an amplifier, and a common power source, the amplifier selection device comprising:
 a display;
 a characteristic data storage configured to store a database including respective characteristic data of a plurality of motors, a plurality of amplifiers, and a plurality of common power sources; and
 a processor configured to
  cause the display to display
   a list of identification information of the plurality of motors, and
   a motor selection command input section for receiving a selection command to select the motor to correspond to the identification information of the plurality of motors,
  select the motor for which the selection command is input into the motor selection command input section,
  cause the display to display
   a list of identification information of the plurality of amplifiers, and
   an amplifier selection command input section for receiving a selection command to select the amplifier to be combined with the selected motor to correspond to the identification information of the plurality of amplifiers,
  select the amplifier for which the selection command is input into the amplifier selection command input section,
  cause the display to display
   a list of identification information of the plurality of common power sources, and
   a common power source selection command input section for receiving a selection command to select the common power source to be combined with the selected motor and the selected amplifier to correspond to the identification information of the plurality of common power sources,
  select the common power source for which the selection command is input into the common power source selection command input section,
  cause the display to display a combination of the selected motor, the selected amplifier, and the selected common power source, and
  determine whether a relation of the characteristic data between the selected motor and the selected amplifier satisfies a first condition under which the selected amplifier drives the selected motor, and whether a relation of the characteristic data between the selected motor and the selected common power source satisfies a second condition under which the selected common power source drives the selected motor,
 wherein in response to a determination that at least one of the first condition or the second condition is not satisfied, the processor is configured to cause the display to indicate the displayed combination of the selected motor and the selected amplifier, of which the relation of the characteristic data fails to satisfy the first condition, or
 indicate the displayed a combination of the selected motor and the selected common power source, of which the relation of the characteristic data fails to satisfy the second condition,
 the characteristic data of the selected motor include a continuous rated current, a short-time rated current, an maximum current during acceleration, a continuous rated output, a short-time rated output, and an acceleration maximum output of the selected motor,
 the characteristic data of the selected amplifier include a continuous rated current, a short-time rated current, and an maximum current during acceleration of the selected amplifier,
 the characteristic data of the selected common power source include a continuous rated output, a short-time rated output, and an acceleration maximum output of the selected common power source,
 the first condition is set such that the continuous rated current, the short-time rated current, and the maximum current during acceleration of the selected amplifier are respectively equal to or higher than values of the continuous rated current, the short-time rated current, and the maximum current during acceleration of the selected motor, and the second condition is set such that the continuous rated output, the short-time rated output, and the acceleration maximum output of the selected common power source are respectively equal to or higher than sums of the continuous rated output, the short-time rated output, and the acceleration maximum output of the selected motor.

2. An amplifier selection method of selecting a motor, an amplifier, and a common power source, the amplifier selection method comprising:

storing a database including respective characteristic data of a plurality of motors, a plurality of amplifiers, and a plurality of common power sources, displaying a list of identification information of the plurality of motors, displaying a motor selection command input section for receiving a selection command to select the motor to correspond to the identification information of the plurality of motors, selecting the motor for which the selection command is input into the motor selection command input section, displaying a list of identification information of the plurality of amplifiers, displaying an amplifier selection command input section for receiving a selection command to select the amplifier to be combined with the selected motor to correspond to the identification information of the plurality of amplifiers, selecting the amplifier for which the selection command is input into the amplifier selection command input section, displaying a combination of the selected motor and the selected amplifier, determining whether a relation of the characteristic data between the selected motor and the selected amplifier satisfies a first condition under which the amplifier drives the motor, indicating, in response to a determination that the first condition is not satisfied, the displayed combination of the selected motor and the selected amplifier, of which the relation of the characteristic data fails to satisfy the first condition, displaying a list of identification information of the plurality of common power sources, displaying a common power source selection command input section for receiving a selection command to select the common power source to be combined with the selected motor and the selected amplifier to correspond to the identification information of the plurality of common power sources, selecting the common power source for which the selection command is input into the common power source selection command input section, displaying a combination of the selected motor, the selected amplifier, and the selected common power source, determining whether a relation of the characteristic data between the selected motor and the selected common power source satisfies a second condition under which the selected common power source drives the selected motor, and identifying, in response to a determination that the second condition is not satisfied, the displayed combination of the selected motor and the selected common power source, of which the relation of the characteristic data fails to satisfy the second condition, wherein the characteristic data of the selected motor include a continuous rated current, a short-time rated current, an maximum current during acceleration, a continuous rated output, a short-time rated output, and an acceleration maximum output of the selected motor, the characteristic data of the selected amplifier include a continuous rated current, a short-time rated current, and an maximum current during acceleration of the selected amplifier, the characteristic data of the selected common power source include a continuous rated output, a short-time rated output, and an acceleration maximum output of the selected common power source, the first condition is set such that the continuous rated current, the short-time rated current, and the maximum current during acceleration of the selected amplifier are respectively equal to or higher than values of the continuous rated current, the short-time rated current, and the maximum current during acceleration of the selected motor, and the second condition is set such that the continuous rated output, the short-time rated output, and the acceleration maximum output of the selected common power source are respectively equal to or higher than sums of the continuous rated output, the short-time rated output, and the acceleration maximum output of the selected motor.

3. A non-transitory computer readable medium for selecting a motor, an amplifier, and a common power source, the non-transitory computer readable medium storing an amplifier selection program for causing, when executed by a device having a display, the device to execute:

a characteristic data storage process for storing a database including respective characteristic data of a plurality of motors, a plurality of amplifiers, and a plurality of common power sources, a motor selection process for
displaying on the display
a list of identification information of the plurality of motors, and
a motor selection command input section for receiving a selection command to select the motor to correspond to the identification information of the plurality of motors, and
selecting the motor for which the selection command is input into the motor selection command input section, an amplifier selection process for
displaying on the display
a list of identification information of the plurality of amplifiers, and
an amplifier selection command input section for receiving a selection command to select the amplifier to be combined with the selected motor selected in the motor selection process to correspond to the identification information of the plurality of amplifiers, and
selecting the amplifier for which the selection command is input into the amplifier selection command input section, a first display process for displaying on the display a combination of the selected motor and the selected amplifier, a first determination process for determining whether a relation of the characteristic data between the selected motor and the selected amplifier satisfies a first condition under which the selected amplifier drives the selected motor, a first inappropriate combination clarifying process for indicating, in response to a determination that the first condition is not satisfied in the first determination process, the displayed combination of the selected motor and the selected amplifier, of which a relation of the characteristic data fails to satisfy the first condition, a common power source selection process for displaying on the display
- a list of identification information of the plurality of common power sources, and
- a common power source selection command input section for receiving a selection command to select the common power source to be combined with the selected motor selected in the motor selection process and the selected amplifier selected in the amplifier selection process to correspond to the identification information of the plurality of common power sources, and selecting the common power source for which the selection command is input into the common power source selection command input section, a second display process for displaying on the display a combination of the selected motor, the selected amplifier, and the selected common power source, a second determination process for determining whether a relation of the characteristic data between the selected motor and the selected common power source satisfies a second condition under which the selected common power source drives the selected motor, and a second inappropriate combination clarifying process for indicating, in response to a determination that the second condition is not satisfied in the second determination process, the displayed combination of the selected motor and the selected common power source, of which a relation of the characteristic data fails to satisfy the second condition, wherein the characteristic data of the selected motor include a continuous rated current, a short-time rated current, an maximum current during acceleration, a continuous rated output, a short-time rated output, and an acceleration maximum output of the selected motor, the characteristic data of the selected amplifier include a continuous rated current, a short-time rated current, and an maximum current during acceleration of the selected amplifier, the characteristic data of the selected common power source include a continuous rated output, a short-time rated output, and an acceleration maximum output of the selected common power source, the first condition is set such that the continuous rated current, the short-time rated current, and the maximum current during acceleration of the selected amplifier are respectively equal to or higher than values of the continuous rated current, the short-time rated current, and the maximum current during acceleration of the selected motor, and the second condition is set such that the continuous rated output, the short-time rated output, and the acceleration maximum output of the selected common power source are respectively equal to or higher than sums of the continuous rated output, the short-time rated output, and the acceleration maximum output of the selected motor.

\* \* \* \* \*